United States Patent [19]

Fortune

[11] Patent Number: 5,054,106
[45] Date of Patent: Oct. 1, 1991

[54] HOT GAS SOLDERING SYSTEM

[76] Inventor: William S. Fortune, 29866 Cuthbert Rd., Malibu, Calif. 90265

[21] Appl. No.: 253,707

[22] Filed: Oct. 5, 1988

[51] Int. Cl.$^5$ .................... B23K 3/053; F24H 3/04
[52] U.S. Cl. .................... 392/476; 219/230; 228/20; 392/472; 392/473; 174/47
[58] Field of Search ............... 219/373, 374, 375, 381, 219/227, 229, 228, 230, 240, 242, 497, 501, 137.9; 228/20, 51-53, 242, 19; 392/472, 473, 474, 476, 379, 382, 383, 384; 362/32, 92, 96; 174/47; 350/96.26

[56] References Cited

U.S. PATENT DOCUMENTS

| | | | |
|---|---|---|---|
| 1,188,952 | 6/1916 | Laird | 392/473 |
| 1,252,614 | 1/1918 | Pieper et al. | 392/476 |
| 1,439,340 | 12/1922 | St. Clair | 219/374 |
| 1,905,343 | 4/1933 | Carpenter | 392/472 |
| 2,028,095 | 1/1936 | Tully et al. | 392/476 |
| 2,330,592 | 9/1943 | Kendrick | 362/96 |
| 2,494,840 | 1/1950 | Stephenson | 219/230 |
| 2,632,089 | 3/1953 | Buckmaster | 219/381 |
| 3,109,912 | 11/1963 | Cerulli | 392/476 |
| 3,411,594 | 11/1968 | Siegel | 219/230 |
| 3,422,247 | 1/1969 | Royston et al. | 219/227 |
| 3,690,539 | 9/1972 | Geiger | 219/229 |
| 3,770,201 | 11/1973 | Sanders | 219/373 |
| 3,822,035 | 7/1974 | Kopernak | 219/229 |
| 3,990,623 | 11/1976 | Fortune | 219/242 |
| 4,038,519 | 7/1977 | Foucvas | 174/47 |
| 4,117,967 | 10/1978 | Regelson et al. | 228/20 |
| 4,426,571 | 1/1984 | Beck | 219/373 |
| 4,725,715 | 2/1988 | Salinier et al. | 219/374 |
| 4,734,559 | 3/1988 | Fortune et al. | 219/240 |
| 4,762,979 | 8/1988 | Geoffroi | 228/51 |
| 4,773,582 | 9/1988 | Veila | 219/230 |
| 4,787,548 | 11/1988 | Abbagnaro et al. | 219/373 |
| 4,804,129 | 2/1989 | Brown et al. | 219/230 |
| 4,868,369 | 9/1989 | Chen | 219/242 |

FOREIGN PATENT DOCUMENTS

2167700  6/1986  United Kingdom ............ 219/137.9

*Primary Examiner*—Geoffrey S. Evans
*Attorney, Agent, or Firm*—Daniel T. Anderson

[57] ABSTRACT

In a soldering system which utilizes a fine jet of very hot gas for heating the work point the hot air may impinge directly on the work point or it may heat a soldering tip from within whereby it may be used in a more conventional mode of soldering or desoldering. A regulated flow of gas to the heater of the soldering instrument may be somewhat preheated by passing along the leads carrying the electric power to the heating element. The same supply of air may also be used to cool the handle of the handle of the soldering instrument for operator comfort and safety. The temperature of the heating element is remotely electronically controlled by a time share use of the power leads as temperature sensing and feedback.

4 Claims, 8 Drawing Sheets

HOT GAS SOLDERING SYSTEM

BACKGROUND OF THE INVENTION

This invention relates generally to the field of hand held soldering/desoldering tools and, more particularly, to such instruments which utilize a stream of gas to convey heat from its source along at least a portion of the path to the soldering point, the term "hand held" being intended to include robotic or robot-like applications. The term "gas" as used here usually means ambient air, but may include inert or relatively inert gases such, for example, as carbon dioxide or nitrogen or the noble gases or the like as when oxidation, corrosive reactions, or other undesired chemical action is to be minimized.

The advantages of hot gas soldering have become known and understood in recent years and are discussed in detail in Applicant's U.S. Pat. No. 4,926,028 co-pending application Ser. No. 47,771 filed May 8, 1987, the original parent case of which was Ser. No. 471,097 filed Mar. 1, 1983 and now abandoned. Both applications were entitled "Hot Air Soldering Instrument". It suffices here to point out that hot gas soldering by a stream of very hot gas with a very small cross section can apply precisely the desired quantity of heat at precisely the desired work point without deleteriously heating other adjoining or contiguous material or objects. In addition, the gas stream presents to the work point a substantially constant temperature heat source—unlike a conventional soldering tip the temperature of which inherently varies somewhat as varying amounts of heat are drawn therefrom and then replenished along a metal conduction path. A related advantage is that the gas may be heated instantly as it flows across, in heat exchange relation, the heat source and is instantly applied to the work point while a conventional soldering tool, exhibiting a significantly greater degree of thermal inertia, requires that heat be conducted through the solid components of the tool until the tip, inherently at some distance from the source, reaches a temperature adequate for working.

It may also be pointed out that by hot gas techniques, a thinwalled, low inertia soldering tip may be heated on its inside by an internally directed stream of hot gas providing most of the above advantages. In addition, although the soldering action is more like conventional soldering, the tip may be very desirably of iron composition since copper is not needed for its high thermal conductivity. Thusly avoided are the weight and expense of copper and its plating as well as its high vulnerability to decay by chemical reactions aggravated by its intense thermal environment.

These and other advantages of hot gas soldering have not been achieved in the prior art because of the difficulty of generating the gas stream, satisfactorily heating it, and providing means for shaping it and directing it upon the work point.

It is accordingly an object of the present invention to provide a hot gas soldering system which exhibits all these advantages of hot gas techniques.

It is another object to provide such a system which substantially instantly generates and applies to a work point a hot gas stream of predetermined cross section at a temperature of the order of 1500 degrees Fahrenheit and with a predetermined desired rate of heat energy flow to the work point.

It is another object to provide such a system in which the gas supply to the soldering instrument may be somewhat preheated by the electrical conductors conveying power to the heating element and in which the soldering instrument handle is cooled by the flow therethrough of the gas.

It is another object to provide gas heating apparatus for such a system which is exceedingly effective and efficient in supplying a very high temperature stream of air for soldering.

It is another object to provide such a system which is structurally simple, reliable, mechanically rugged, and inexpensive to manufacture.

It is another object to provide such a system in which the temperature of the heating element is electronically controlled remotely from the body of the soldering instrument itself.

SUMMARY OF THE INVENTION

Briefly, these and other objects are achieved in accordance with the structural aspects of a presently preferred example of the invention which includes a base unit having a cradle or holder for the soldering instrument itself and which houses electronic temperature control means of the character which utilizes the power leads to the soldering instrument, on a time sharing basis, to measure the electrical resistance of the heating element, derive a signal representative thereof, and use that signal to control the power flow along the power leads to the soldering instrument and thereby control the temperature of the heating element on a very fast response basis.

The base unit also may house a source of the gas to be heated for soldering; and such a source may be an electrically powered air compressor which is connected to the interior of the handle of the soldering instrument by a flexible plastic or rubber hose. In this example the hose also carries the power leads to the instrument whereby the air flowing along the conduit is somewhat preheated by the $I^2R$ power loss in the leads. The air is fed through the length of the conduit hose to the interior of the body of the soldering instrument from whence a portion of it is fed over the surface of the handle and exhausted for cooling the handle; and the remainder is fed by a circuitous and turbulent path through the front end, heater portion of the soldering instrument wherein it is heated by the electric heating element and directed forwardly from the tip of the instrument into a soldering air jet which may be caused to impinge upon a soldering point. Alternatively, the heated air may be directed against the forward, inner wall of a soldering tip for somewhat more conventional soldering operations. In either case the hot air may be considered to be impinging upon a "soldering point" for melting solder.

Details of the above, and other features of the invention and their advantages, will be more fully understood from a consideration of the following description taken in connection with the drawings.

DETAILED DESCRIPTION OF PREFERRED EMBODIMENT

Figure 1:
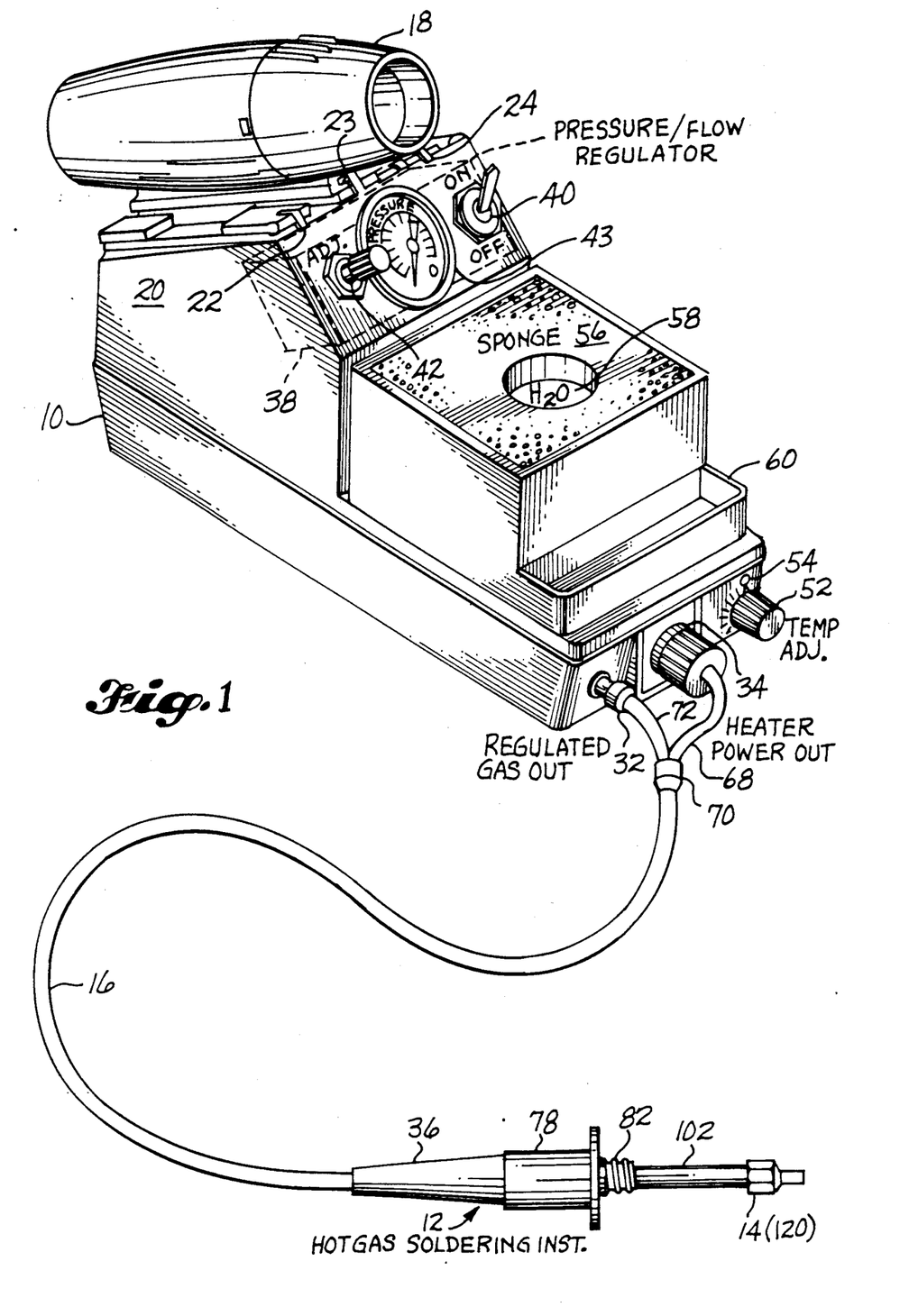
FIG. 1 is a perspective view of an example of a hot gas soldering system constructed in accordance with the principles of the present invention.
Figure 2:
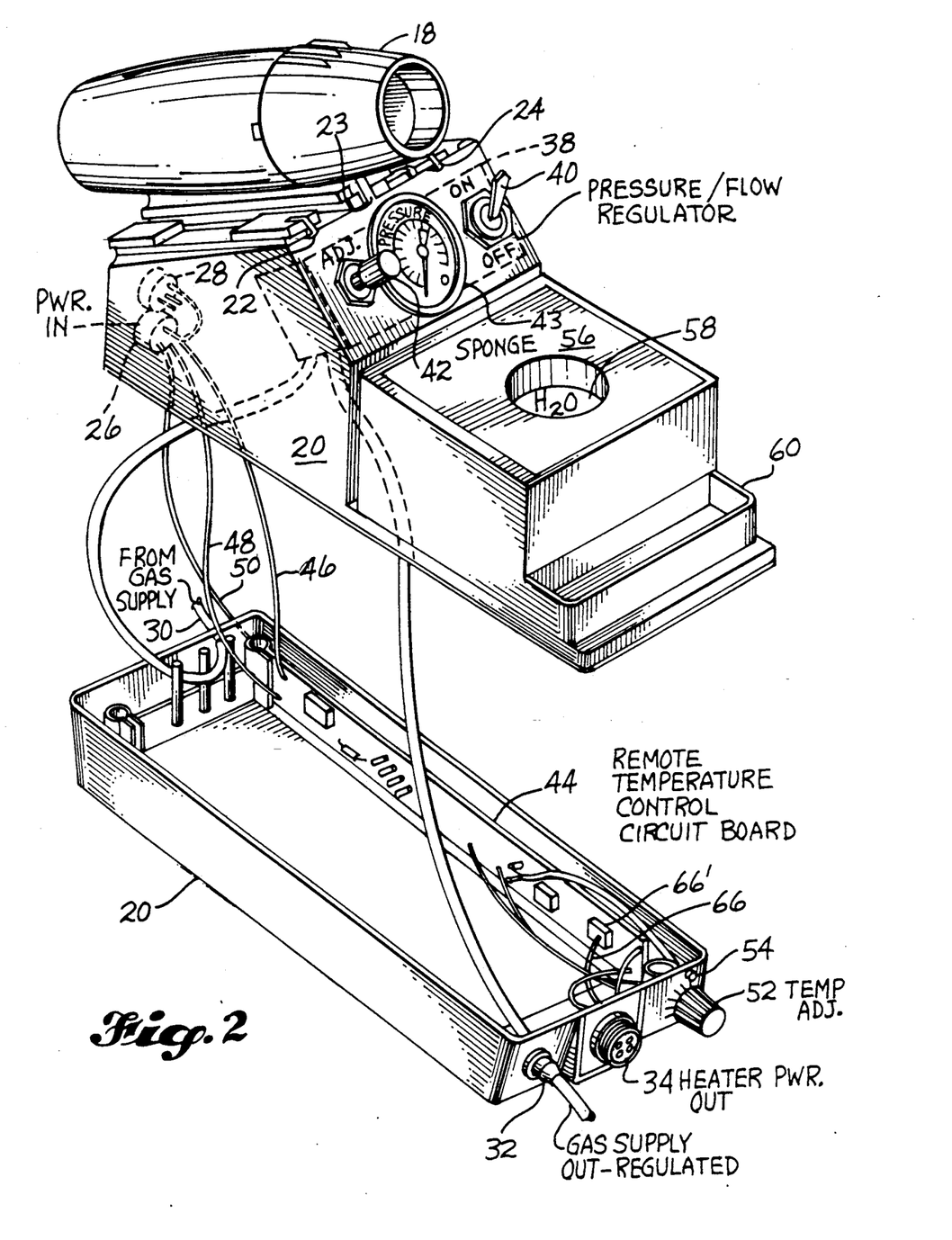
FIG. 2 is a partially exploded perspective view of the base unit thereof.
Figures 3, 12, 13:
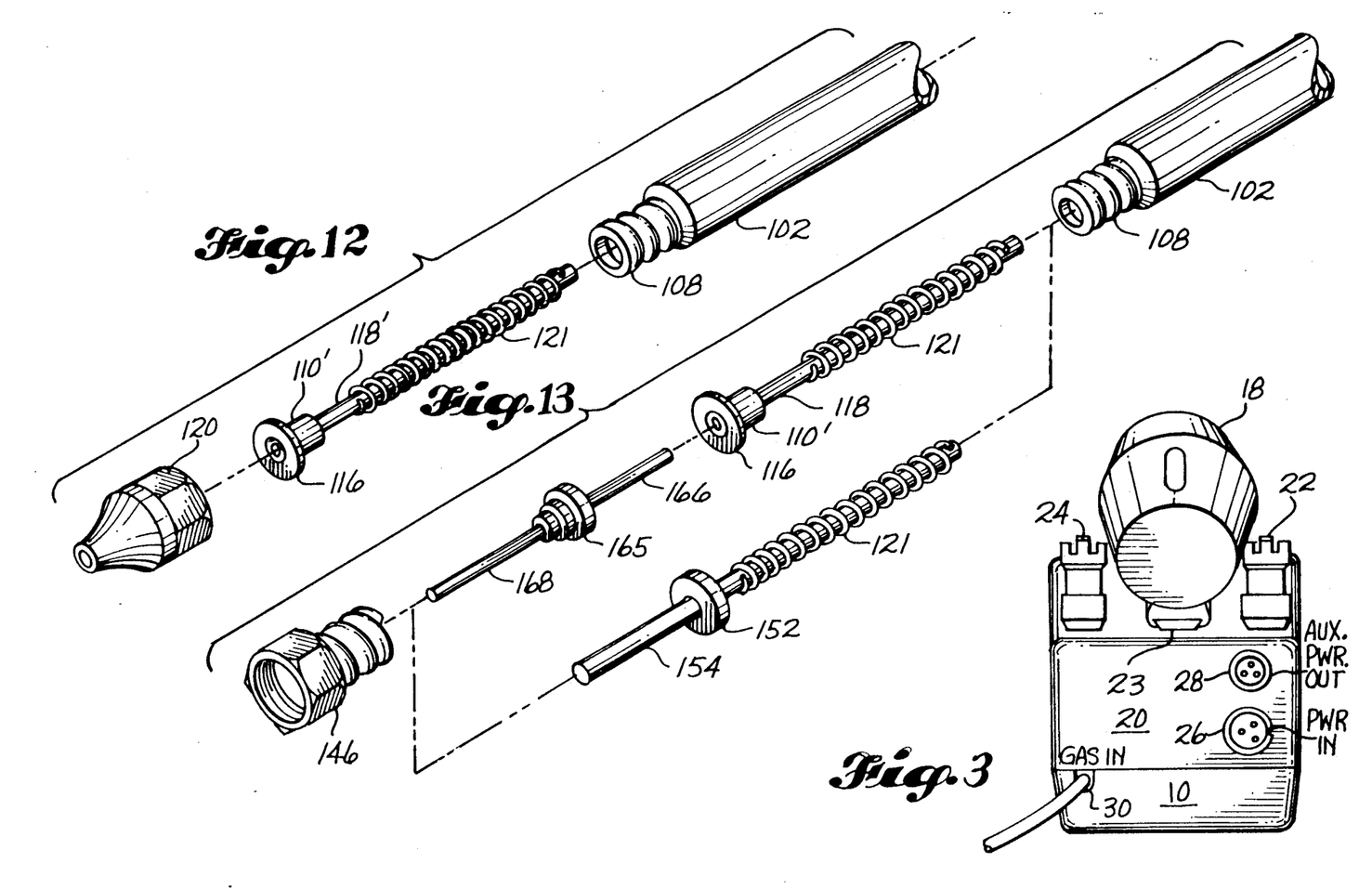
FIG. 3 is rear elevational view of the base unit.
FIG. 12 is an exploded, perspective view of a portion of the apparatus shown in FIG. 5.
FIG. 13 is a similar view of two alternative tip arrangements of the invention.

The example of the invention illustrated in FIGS. 1, 2, and 3 includes a base unit 10, a hand held soldering instrument 12 having a hot gas tip 14, and an interconnecting supply line 16 for carrying electrical leads and gas to the instrument 12. A removeable insulated and protective holder 18 for the instrument 12 is shown attached to the base housing 20 by the central one of three mating slip-on brackets 22, 23, 24. Alternatively, a pair, not shown, of instruments may be held by the base housing by utilizing a pair of holders 18 and the two outside brackets 22, 24.

The housing 20 also carries an electrical power inlet terminal 26, an auxilliary parallel power outlet terminal 28, a gas supply inlet terminal 30 which may be connected to an air compressor, not shown, or other source of pressurized gas, a gas supply outlet terminal 32, and an electrical outlet terminal 34, the latter two terminals being connected, as shown in FIG. 1 to the common cord/hose tube of the supply line 16 which in turn is connected to the handle 36 of the soldering instrument 12.

Contained within the housing 20 is a pressure regulator unit 38 for controlling the flow of gas to the soldering instrument 12. The unit 38 includes an on-off valve 40, a regulator control 42, and an output pressure meter 43.

An electronic circuit board 44 receives power from an external source via terminal 26 and a pair of internal leads 46, 48. An associated ground lead 50 connects the terminal 26, the circuit board 44, the output terminal 34, and, ultimately, the exposed metal portions of the soldering instrument 12 to the ground of the external electric power source. The reference numeral 50 or 50' is used consistently throughout this description to indicate a lead connecting between articles grounded or to be grounded.

The electronic circuit of the board 44 is, in this example, of the character to control remotely the temperature of the heating element of the soldering instrument 12 by using for a very short portion of the period of each cycle, including an inflection point, of the applied alternating current to effect a resistance measurement of the electrical heating element, the magnitude of that electrical resistance being a function of its temperature. A signal representative of the instantaneous value of the resistance is generated which is used in a feedback sense to control the current flow to the heating element to cause it to maintain a predetermined desired temperature. Thusly, without a separate sensor in the soldering tip and without separate leads being used for a temperature feedback signal, essentially full wave power is continuously impressed on the heater. This technique and its application as herein is described in U.S. Pat. No. 4,507,546 issued Mar. 26, 1985, and U.S. Pat. No. 4,734,559 issued Mar. 29, 1988, both to William S. Fortune and Wayne A. Murray. A single control 52 is used for on-off and soldering tip temperature setting. A pilot lamp 54 is shown for indicating when the circuit is energized and when power is actually being supplied to the heater element, the different "on" modes being distinguished, for example, by a constant versus an alternating illumination of the lamp 54.

To complete the description of the base unit 10 and housing 20, it may be noted that a tip cleaning sponge 56 moistened by a water, or other cleaning fluid, reservoir 58 is shown at its forward end. A small tool tray 60 may be provided, as shown, for holding items such as extra tips, a tip wrench, or the like. The base unit is molded of a relatively high density, impact resistant plastic and is preferably carbon loaded or otherwise made adequately conductive to preclude any build-up of static charge.

Figure 4:
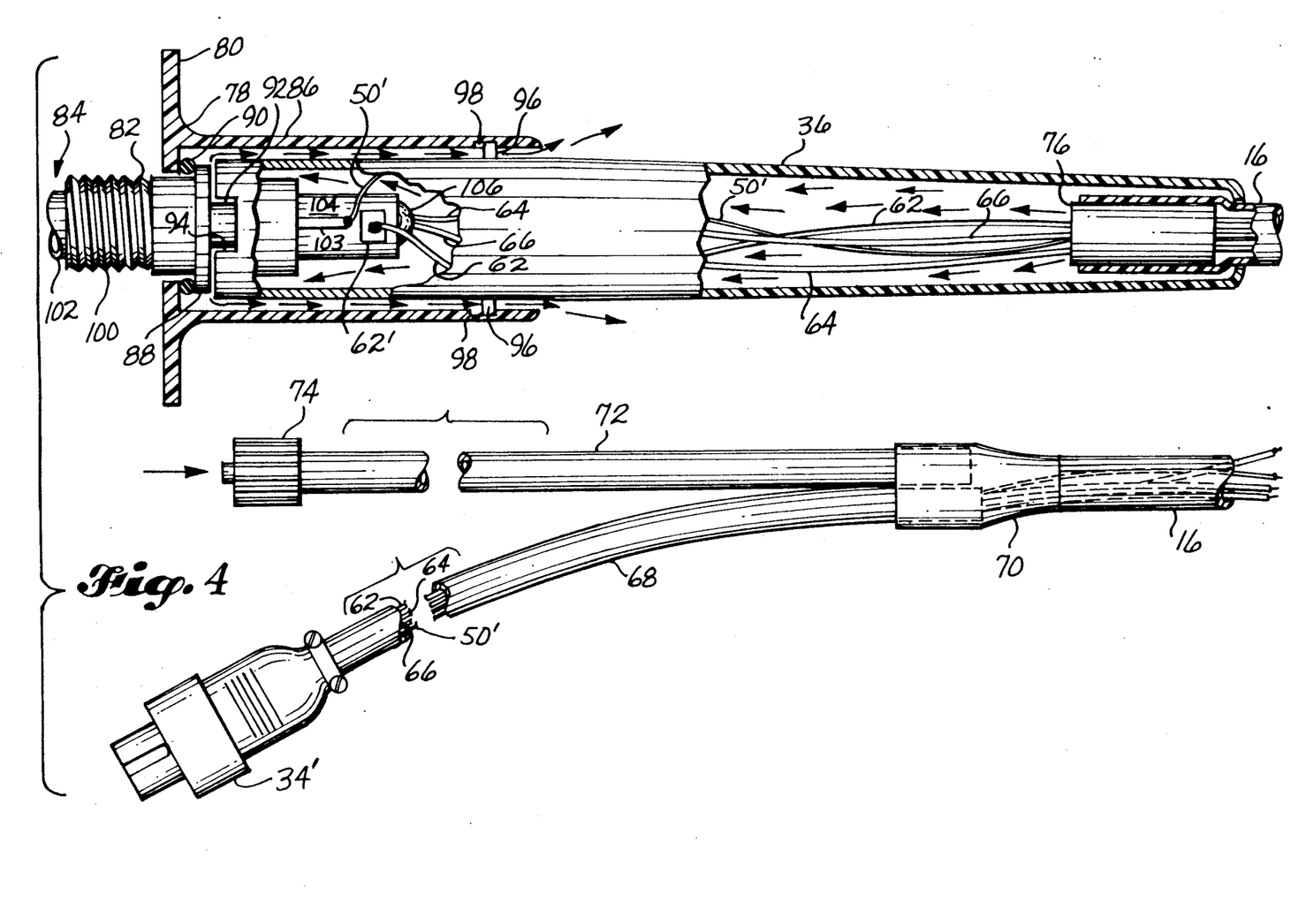
FIG. 4 is a view, partially in longitudinal section, of the handle and supply cord thereof.

Referring to FIG. 4, the composite supply line 16 is shown to include a cable connector 34' for mating with the housing terminal 34 and carrying four leads: two power leads 62, 64, a fibre optic lead 66, and a bare ground wire 50' along a connector cord 68 to a Y junction fitting 70 with a gas supply tube 72 for connection by a coupler 74 to the gas outlet terminal 32. The cord 68 is blocked with respect to passage of any of the gas therethrough. The fitting 70 couples the gas supply tube 72 to the composite supply line 16 whereby gas from the regulator unit 38 is carried through the hollow interior of the line 16 to the interior of the handle 36 of the soldering instrument 12. An enlarged diameter retainer bushing 76 is forced within the end of the line 16 inside the handle 36 to lock the tube to the soldering instrument. The four leads, electrical and optic are also carried within the line 16 which may readily be of the character to be appropriately insulative, flexible, and mechanically protective of the leads. In addition, the material of the line 16 may be sufficiently loaded or coated to prevent static charge build-up.

It is important to note two effects within the supply 16 as the gas flows therethrough: 1) static electricity which may otherwise accumulate because of the gas flow over the dieletric materials therein and cause a high and deleterious potential is effectively conducted away by the bare ground lead 50'; and 2) the supply is somewhat preheated by its flow over the current carrying leads 62, 64 which are warmed due to their inherent $I^2R$ losses.

Surrounding the forward portion of the handle 36 is disposed a finger guard 78 which includes a large diameter forward flange portion 80 having a central opening through which the base end plug body 82 of the heater assembly 84 passes. A skirt portion 86 formed integrally and concentrically with the flange portion 80 extends rearwardly therefrom over the forward portion of the handle 36. An annular gap is provided between the skirt portion and the handle's outer surface to insulate the finger guard and to provide further cooling for operator comfort by the forced flow therethrough of the pressurized gas from the plenum of the interior of the handle 36. The actual flow path is shown in detail in subsequent figures.

The plug body 82 has an enlarged diameter retaining shoulder 88 disposed within the finger guard., and an elastameric o-ring 90 is shown disposed compressively between the rear of the flange portion 80 and the retaining shoulder 88. The plug body 82 behind the retaining shoulder 88 is disposed within the forward end of the handle 36 except for a pair of rotation resisting, mating tabs 92 and notches 94 on these respective elements. The assembly is held together by a diametrically opposed pair of locking tabs 96 molded on the exterior of the handle 36 and a matching set of slots 98 formed on the inner surface of the skirt portion 86. With the sets of tabs 92 and notches 94 in line, the handle 36 is pushed forwardly against the rear of the retaining shoulder 88 which in turn compresses the o-ring 90 against the flange 80 until the tabs 96 pop into their respective slots 98. The assembly may be taken apart by pressing the plastic, deformable skirt portion 86 radially inwardly at a pair of diametrically opposed points thereon disposed angularly 90° from the slots 98.

Other elements of the heater assembly 84 illustrated in FIG. 4 are the utility threads 100 for affixing special tips and accessories to the instrument, a portion of its metal sheath 102 with its grounding lug 103, the rear end of the ceramic heater cylinder 104 with one of its electric terminals 62', 64', and some silastic potting material 106 to plug the end of the cylinder against airflow therethrough and to retain the fiber optic lead 66.

Figures 5, 7, 8, 9, 10, 11:
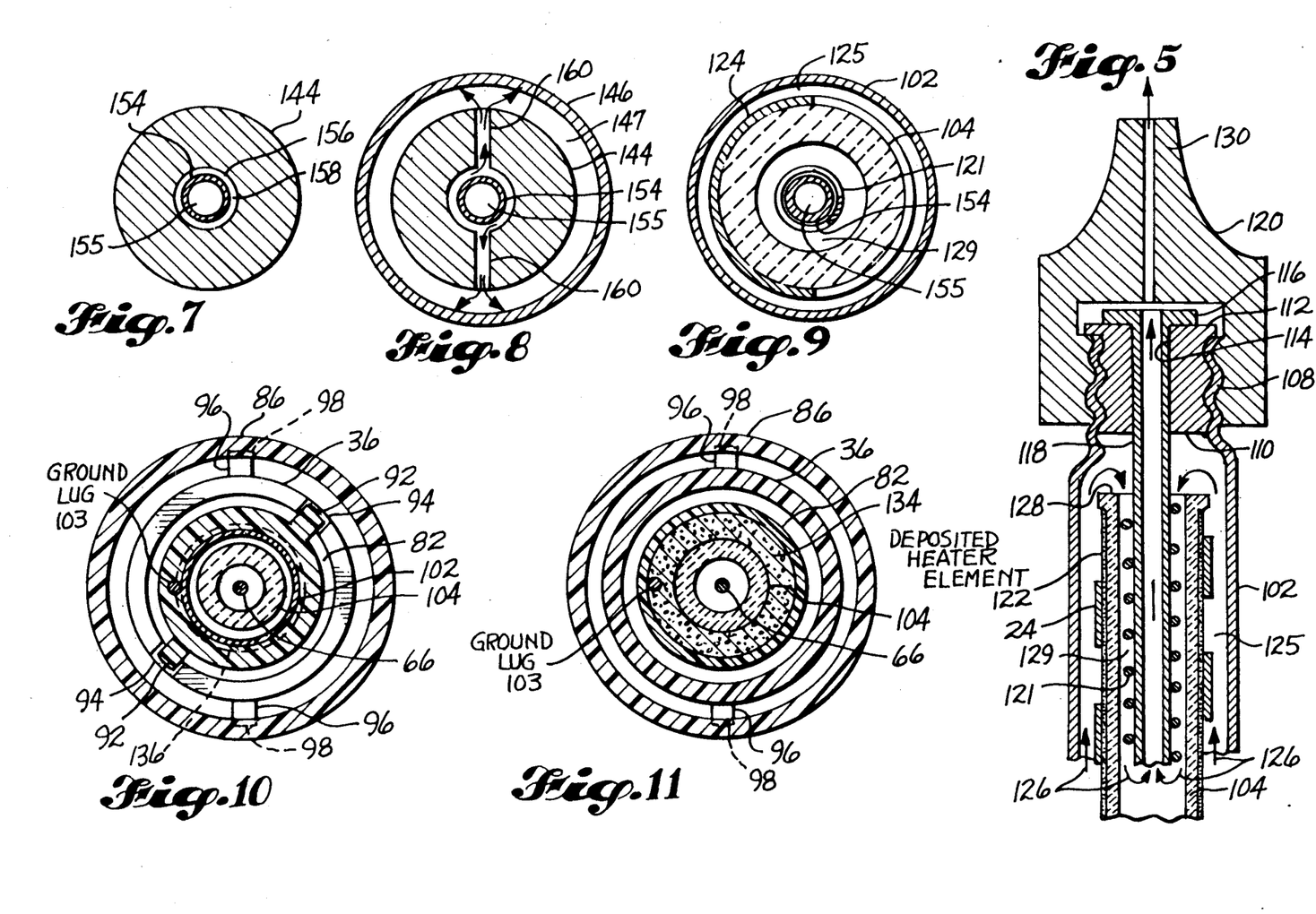
FIG. 5 is a longitudinal sectional view of the soldering tip end thereof.
FIG. 7 is a cross sectional view of the structure shown in FIG. 6 taken along the reference lines 7—7 thereof.
FIG. 8 is a cross sectional view of the structure shown in FIG. 6 taken along the reference lines 8—8 thereof.
FIG. 9 is a cross sectional view of the structure shown in FIG. 6 taken along the reference lines 9—9 thereof.
FIG. 10 is a cross sectional view of the structure shown in FIG. 6 taken along the reference lines 10—10 thereof.
FIG. 11 is a cross sectional view of the structure shown in FIG. 6 taken along the reference lines 11—11 thereof.

Referring to FIG. 5, the forward end of the heater assembly of this example of the invention is shown to include the metal sheath 102 terminated at its forward end by a reduced diameter portion formed with pressed threads 108 manifest on both its inner and outer surfaces. A retainer bushing 110 is threaded into the inner of the threads 108 until its forward larger diameter portion 112 is tight against the end of the metal sheath 102. A central bore 114 retains the forward enlarged diameter end 116 of a gas circulator tube 118. A threaded nozzle tip 120, as an example of the tip 14 shown in FIG. 1, is shown screwed onto the outer of the threads 108 to retain the flanged tube 118 tightly against and within the retainer bushing 110.

Most of the length of the circulator tube 118 is wrapped with a heat exchange enhancing filamentary element in the form of a metallic spring 121 wound snugly about its outer surface. This portion of the circulator tube is disposed within the forward end of the ceramic heater tube 104 axially contiguously to the actual heating element 122 which is deposited on the ceramic tube 104 then glazed over with a very thin glass or ceramic insulative coating and may be of the type obtained from, for example, Kyocera in Kyoto, Japan, Model No. F1495.

Wrapped around the ceramic heater tube 104 contiguously to the heating element 122 is a second heat exchange enhancing filamentary element in the form of a metal tape 124 wound snugly over the outer surface of the ceramic cylinder.

The metallic sheath 102 surrounds the ceramic tube and is spaced therefrom to form a cylindrical annular heating chamber 125 and path for the soldering gas. As indicated by the gas flow arrows 126, gas from the handle plenum, as described below, is fed along the annular chamber 125 over the wound tape 124 for enhanced heat pick-up, thence around the end 128 of the ceramic tube 104, cack along the inner annular chamber 129 over the spring like element 121 for more turbulence and heat pick-up from the ceramic heater tube, then forwardly again through the interior of the collector tube 118, and finally forwardly out through the bore 130 of the nozzle tip 120.

Figure 6:
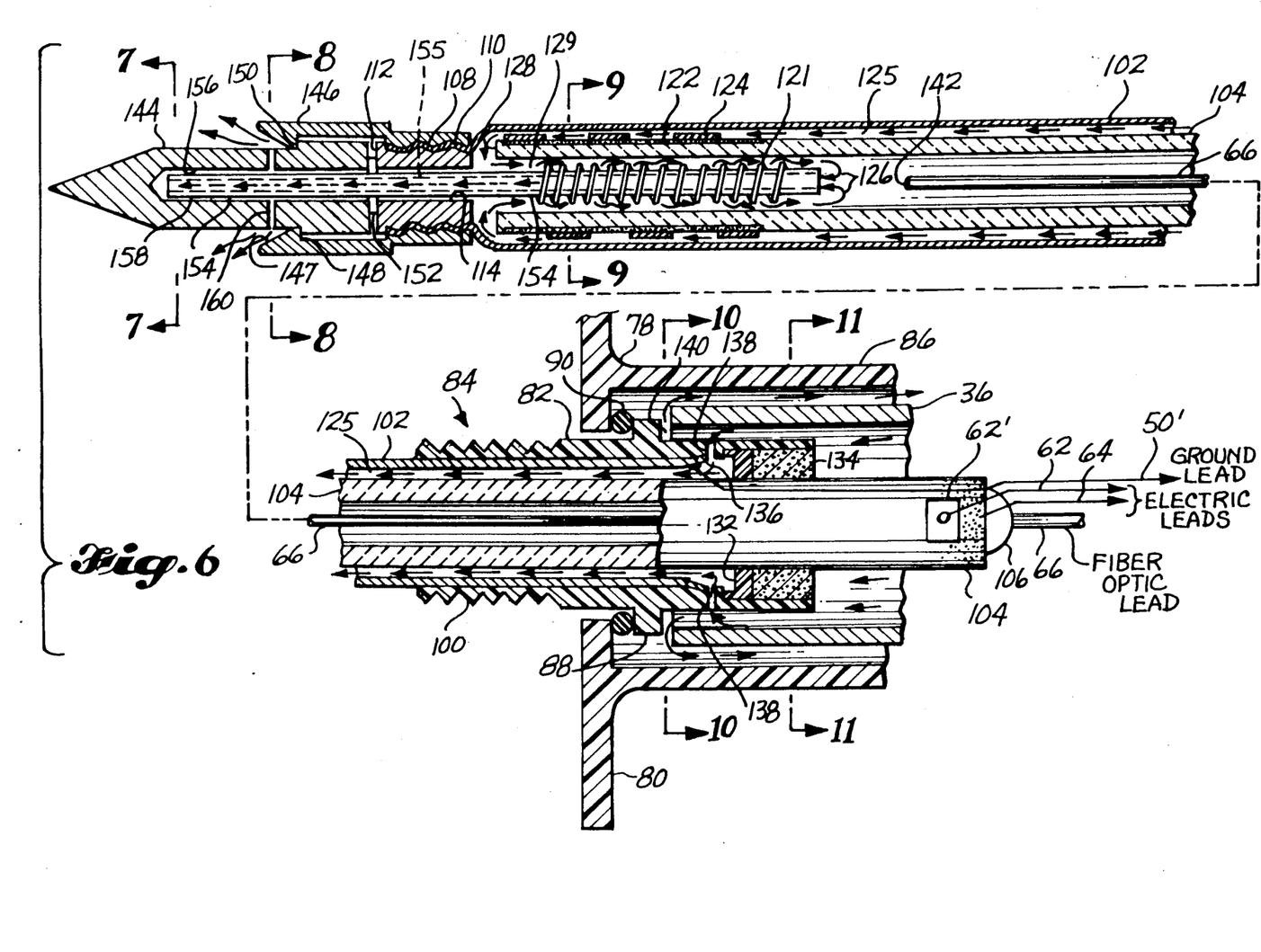
FIG. 6 is a longitudinal sectional view of portions of the handle and heater thereof with an alternate soldering tip.

Referring to FIG. 6, a more detailed view of the interior of the handle 36 and heater assembly 84 is shown with, however, an alternative tip arrangement. The full length of the ceramic heater tube 104 is shown, with one of its electric terminals 62', and silastic material plug 106 at its rear, base end. The fibre optic and electric leads 66, 62, 64 are shown schematically, along with the ground lead 50', extending rearwardly from the ceramic tube. An annual spacer ring 132 centers the ceramic tube 104 within the plug body 82 and a second quantity of silastic material forms a retaining plug 134 to seal the ceramic tube 104 to the plug body 82. The metal sheath 102 is press fitted into the forward portion of the plug body and is securely retained therein by its flared end 136. Gas flow communication between the annular space 125 and the plenum interior of the handle 36 is provided by radially extending bores 138 in the wall of the plug body 82. Gas flow between the plenum and the annular space between the skirt portion 86 of the finger guard 78 and the outer surface of the handle 36 is provided by the axial annular gap 140 between the retaining shoulder 88 of the plug body 82 and the forward end of the handle 36 which is maintained by the contact of the extra length of locking tab 92 in the shorter notch 94 of the handle 36 (see FIG. 4).

The fibre optic lead 66 which extends from, in this example, a light source 66' on the circuit board 44 is shown terminated in a lens 142 for projecting light forwardly along the central bore of the soldering instrument whereby a beam of light normally illuminates the work point for the operator and shows him where the hot gas will impinge upon the work piece. This feature may be understood by considering the basic hot gas nozzle tip arrangement of FIG. 5 since in the alternative arrangement of FIG. 6, the central bore is optically blocked by a solid tip 144 which is held in place by a retainer nut 146 threaded onto the outer of the threads 108 of the metal sheath 102. An inwardly extending retaining shoulder 148 of the nut 146 engages an outwardly extending shoulder 150 on the body of the tip 144. The nut 146 is turned onto the threads 108 until the base end of the tip is compressed tightly against a fixed collar 152 on an elongated gas circulator tube 154 which extends well into the heater portion of the ceramic tube 104 and forwardly concentrically into an oversized central bore 156 in the tip 144. The bore extends axially forwardly of the end of the circulator tube whereby the hot gas flowing through the long, central bore 155 of the circulator tube 154 passes out of its forward end and impinges upon the forward bottom of the bore 156 of the tip 144 and returns along the annular gap 158 between the tube 154 and the bore 156 and exhausts through radially directed ports 160. It may be noted that the forward inner surface 147 of the nut 146 is conically shaped for turning the exhausted gas forwardly toward the work point. This feature not only provides a means for blowing overly noxious fumes from the work area but may, when desired, be used to preheat gently the general area of the work point.

In this form of the invention, the tip functions much as a conventional soldering tip but with the advantage that it heats very quickly since the heat is carried by fast flowing hot gas and not by conduction through a high inertia metal path. Accordingly, the tip materials can be of iron instead of copper and iron plated copper thus avoiding the highly undesireable plating process and its expense as well as the weight and corrosion vulnerability of copper. It should be noted that gas heated tips according to this invention may be considerably thinner walled than implied by the geometry of the tip 144 as illustrated.

FIG. 7 is an enlarged cross section view taken through the tip 144 showing its solid iron body, the circulator tube 154, the central gas flow path of the bore 155, and the return path of the annular gap 158 between the tip and the inner tube.

FIG. 8 is similar view taken further rearwardly and showing the exhaust bores 160 and the gas directing conical forward surface 147 of the retainer nut 146.

FIG. 9 is a cross sectional view taken further rearwardly and shows the ceramic heater tube 104 with its deposited heater element 122 and wrapped by the flat metal tape 124 heat exchange enhancer. Concentrically disposed within the ceramic heater tube is the gas circulator tube 154 similarly wrapped by the spring-like 121 heat exchange enhancer. This view illustrates the three concentric, in-cascade hot gas flow paths: the annular gap 125 over the tape 124 and between the outer metal sheath 102, the annular gap 129 over the spring 121 and between the ceramic tube 104 and the inner tube 154, and finally the inner bore 155 thereof.

Referring to FIG. 10, the essentially concentric geometry of the handle portion of the soldering instrument 12 is shown to include the outer handle portion 36 circumscribed by the skirt portion 86 of the finger guard 78. The locking tabs 96 and slots 98 thereof are shown in elevation and dashed lines, respectively. The angular locking tabs 92 and notches 94 of the plug body 82 and handle portion 36, respectively, are also illustrated in this view. Immediately radially inwardly of the plug body 82 is shown the metal sheath 102 just forwardly of its flared rear end 136. This view also shows its grounding lug 103 extending rearwardly from the metal sheath 102. In turn, within the metal sheath is disposed the ceramic tube 104 and the fiber optic lead 66.

The similar view of FIG. 11 taken just rearwardly of the previous figure shows again the outer skirt portion 86 of the finger guard 78, the handle portion 36 and the locking tabs 96 and slots 98 thereof, the rear portion of plug body 82 filled with the silastic potting material 134, the rear portion of the ceramic heater tube 104, and the inner fiber optic lead 66.

In FIGS. 12, 13, 14, 15, and 16, a series of alternative hot gas soldering tips and their respective circulator tubes are shown.

The combination of FIG. 12 is essentially like that shown in FIG. 5 except that the retainer bushing 110' is fabricated integrally with the circulator tube 118' and is not threaded. The bushing 110'—tube 118' and heat exchange enhancer spring 121 are retained within the end of the sleeve 102 by screwing the threaded nozzle tip 120 onto the threads 108 of the forward end of the sleeve 102.

In FIG. 13, two examples are shown which are similar to that of FIG. 6 except that the elongated gas circulator tube 154 is used to direct a well defined stream of hot gas directly onto the work point instead of to heat the rear, inner surface of a tip 144., that is, the tip 144 is simply removed from behind the retainer nut 146 so that the forward end of the circulator tube 154 may direct the hot gas directly to the work point. The other example of FIG. 13 combines the circulator tube 118' of the structure shown in FIG. 12 with a finer, smaller diameter forward extension tube 164 having a central retaining collar 165 and the rear portion 166 of which fits within the circulator tube 118' and forward portion 168 of which extends beyond the retainer nut 146 for use when a particularly fine and precise jet of soldering gas is desired.

Figures 14, 15, 16:
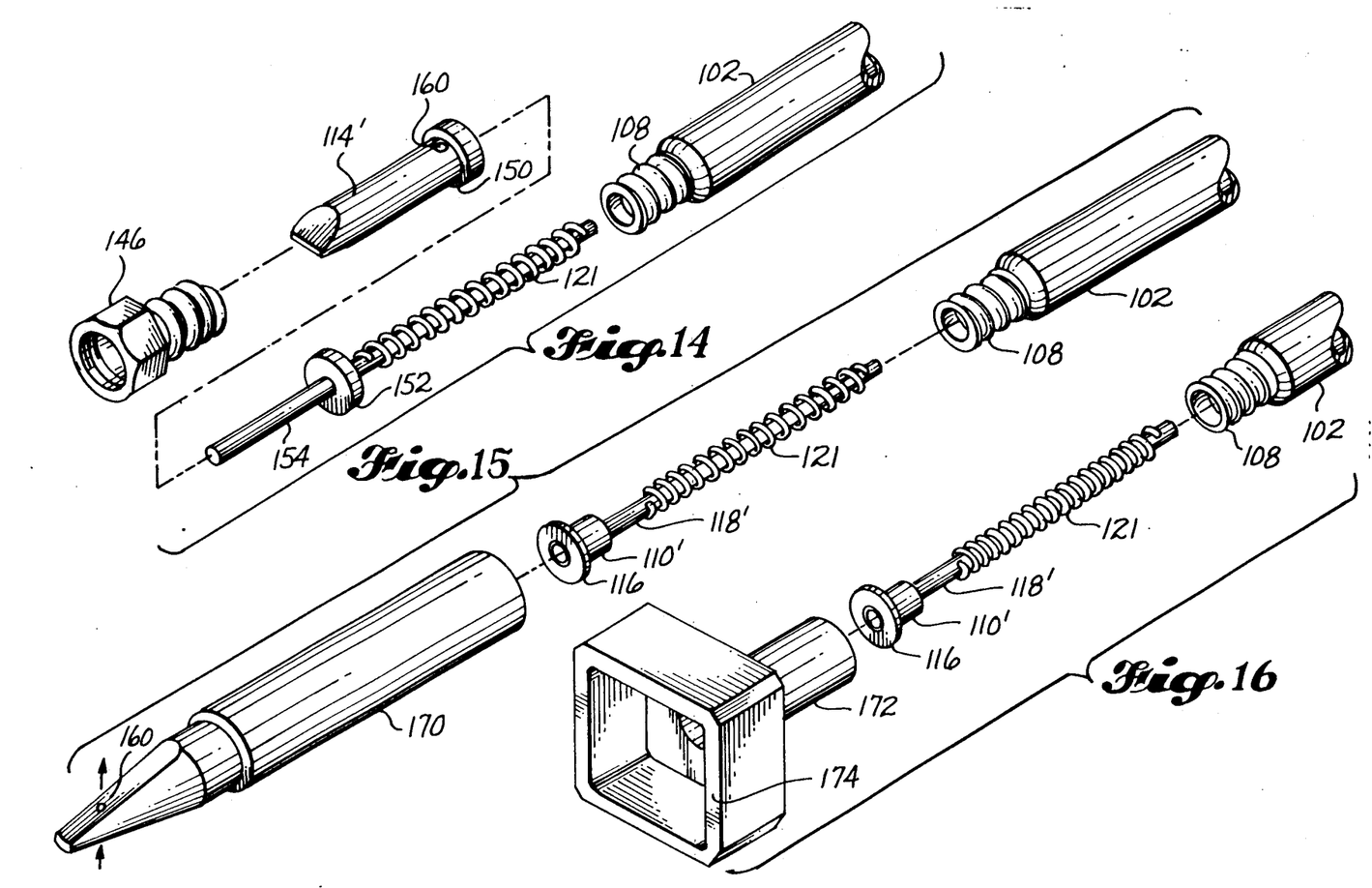
FIGS. 14, 15, and 16, are similar views of further alternative tip arrangements all in accord with the principles of the present invention.

In FIG. 14, the example shown is essentially like that of FIG. 6 shown in an exploded form without the retainer bushing 110, for simplicity, and with a spade, or chisel shaped tip 114'.

Referring to FIG. 15, the forward end structure of FIG. 12 is repeated except that the threaded nozzle tip 120 is shown replaced by a heavy duty, internally threaded tip 170.

FIG. 16 illustrates the same structure again except that the special, internally threaded tip 172 in this case is in the form of a rectangular oven over the peripheral edges 174 of which the hot gas flows when placed closely over a surface mounted circuit board device. With such a tip all the soldering terminals of such a surface mounted device may be melted at one time for ease of soldering or desoldering it with respect to the circuit board.

Figure 17:
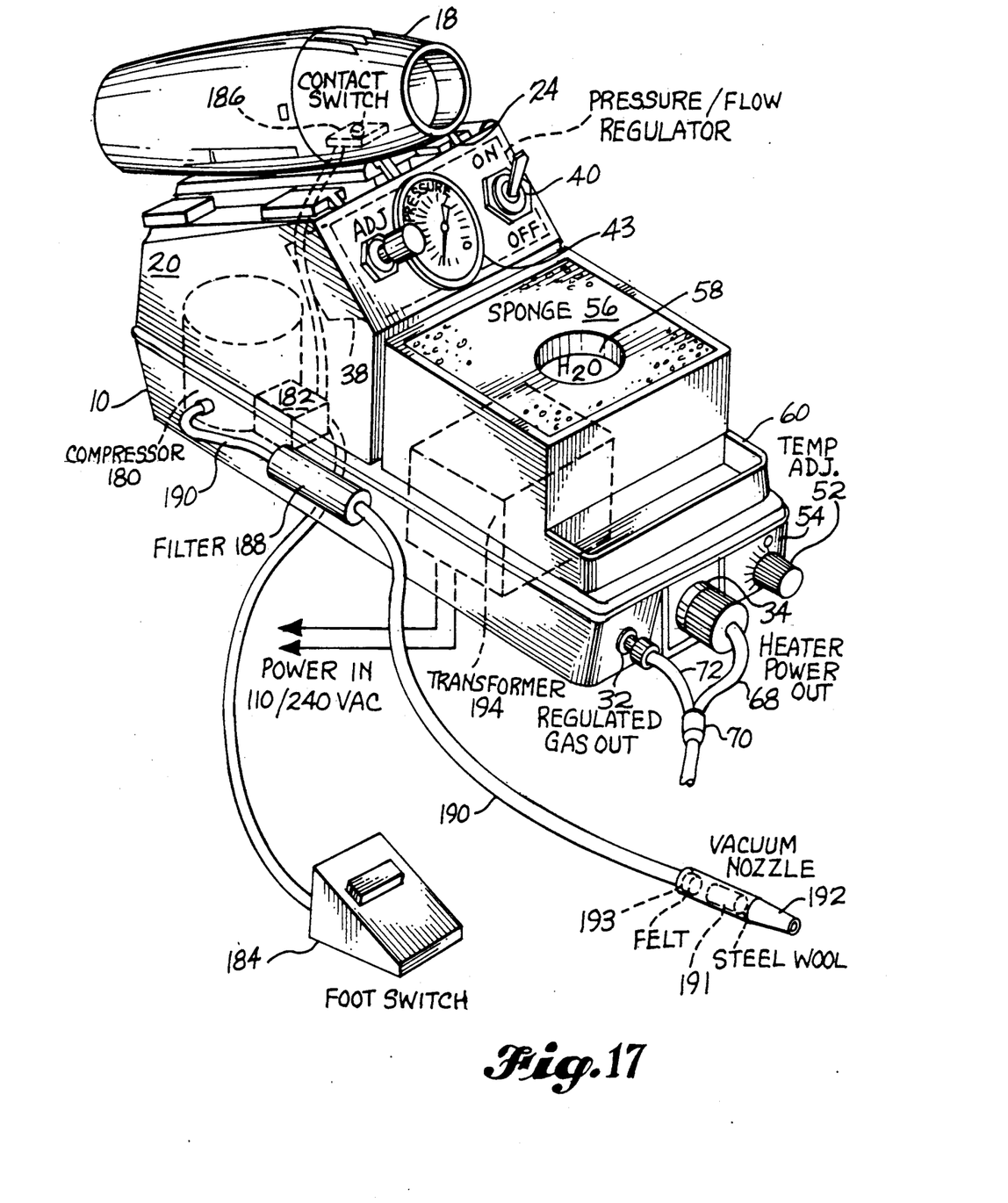
FIG. 17 is a view like FIG. 1 illustrating additional and alternative features of the invention.

Referring to FIG. 17, the basic structure shown in FIG. 1 is illustrated showing, however, a number of additional or alternative features of a hot gas soldering system which may be considered to be essentially self contained. To this end a compact electric compressor 80 is mounted within the base housing 20 with its associated control unit 182. The compressor may be controlled with respect to its on or off modes by the toggle switch 40, by a foot switch 184, or by a contact switch 186 which is activated by withdrawal of the soldering unit 12 from its holder 18. Either of the latter type of controls may be used on a "momentary contact" basis whereby the compressor operates and supplies air flow only when actually desired thus minimizing power consumption, wear on the compressor's mechanical parts, and noise in the environment of the tool. Further in the latter regard a filter-muffler unit 188 may be carried by the housing 20 further to quiet the operation of the compressor.

Utilizing the input to the compressor as a vacuum source is a major feature of this example of the invention. A vacuum hose 190 terminated in a vacuum nozzle 192 may be used for noxious soldering fumes removal at the workpiece and/or for desoldering when desired. For utilization in such mode, the nozzle 192 preferably contains a removeable filter system consisting of a steel wool cartridge 191 for collection of course pieces of solder and a felt disc 193 for collecting smaller bits of solder and solidified resin and the like.

The base housing 20 may also carry a transformer 194 to convert high voltage line power to, for example, 12 or 24 volts for energizing the compressor, the heater, the fiber optics, and all control functions.

There have thus been disclosed and described here a number of examples of a hot gas soldering system which achieves the objects and exhibits the various advantages discussed above.

I claim:

1. Hot gas soldering system comprising:
   base housing body;
   electric power supply means carried therein for energizing a soldering gas heater;
   electronically remotely controlled temperature control circuit carried by said housing body;
   gas supply flow conrol means
   carried by said housing body; soldering tool holding means
   carried by said housing body;
   hot gas soldering tool having handle portion,
   electric heating element carried by said handle portion and coupled to said electric power supply and said temperature control circuit,
   gas heating means connected to said gas supply control means for transferring heat from said heating element to said gas,
   soldering gas jet forming means coupled to said gas heating means for causing the heated gas to impinge upon and heat a predetermined soldering point, and
   combination hose and electric conductors means connecting said housing body and said handle portion, the conductors being disposed within said hose, and said hose also constituting a carrier of said gas from said housing body to said hot gas soldering tool, said hot gas tool further including:
   a hollow metal tubular sheath carried by said handle portion and extending forwardly therefrom,
   a hollow ceramic cylindrical heating element support tube upon the outer surface of the forward end of which is disposed said electric heating element,
   said heating element support tube being carried within and radially spaced from said metal tubular sheath to form a first heating chamber component of said gas heating means,
   an inner, gas circulator tube carried by the forward end of said metal tubular sheath and extending rearwardly therefrom for approximately the length of said electric heating element and being disposed within and radially spaced from said hollow ceramic support tube to form thereby a second heating chamber component of said gas heating means, and
   gas flow means connecting to the interior of said handle portion for carrying gas from said combination hose means, through the interior of said handle portion, forwardly along the length of said first heating chamber, radially inwardly over the forward end of said ceramic heating element support tube, rearwardly along the length of said second heating chamber, radially inwardly over the rear end of said circulator tube, and forwardly toward said soldering work point.

2. The invention as set forth in claim 1 in which said gas heating means includes a spiral filamentary body wrapped about said ceramic support tube along the length of said first heating chamber for increasing the heat exchange between said heating element and the gas.

3. The invention as set forth in claim 2 in which said gas heating means includes a spiral filamentary body wrapped about said collector tube along the length of said second heating chamber for increasing the heat exchange between said heating element and the gas.

4. The invention as set forth in claim 1 which further includes a soldering tip carried by the forward end of said tubular metal sheath,
   said soldering tip having a hollow interior open to its rear to receive the gas flow from said circulator tube, closed across its front, soldering surface end for impingement of the gas flow thereon, and having gas exhaust ports rearwardly of said front, soldering surface end for releasing the spent gas to the environment of said tool.

* * * * *